(12) United States Patent
Stankus

(10) Patent No.: US 6,411,758 B1
(45) Date of Patent: Jun. 25, 2002

(54) METHOD AND APPARATUS FOR ALIGNING A WAVEGUIDE TO A DEVICE

(75) Inventor: John J. Stankus, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/494,457

(22) Filed: Jan. 31, 2000

(51) Int. Cl.⁷ .............................................. G02B 6/30
(52) U.S. Cl. .......................... 385/49; 385/14; 385/31; 385/88; 385/52
(58) Field of Search ........................... 385/14, 15, 31, 385/49, 52, 88, 89, 92, 94, 126, 127, 141

(56) References Cited

U.S. PATENT DOCUMENTS

| | | | | |
|---|---|---|---|---|
| 4,577,209 A | * | 3/1986 | Forrest et al. ............. 385/88 X |
| 4,601,535 A | * | 7/1986 | Tanaka et al. ............. 385/49 X |
| 5,165,002 A | * | 11/1992 | Cumberledge et al. ........ 385/92 |
| 5,177,803 A | * | 1/1993 | Newhouse et al. ........... 385/43 |
| 5,337,396 A | * | 8/1994 | Chen et al. ................ 385/92 |
| 5,384,873 A | * | 1/1995 | Chun et al. ................ 385/31 |
| 5,625,734 A | * | 4/1997 | Thomas et al. .............. 385/88 |
| 5,768,456 A | * | 6/1998 | Knapp et al. ............... 385/49 |
| 5,774,614 A | * | 6/1998 | Gilliland et al. ............. 385/88 |
| 5,804,125 A | * | 9/1998 | Aepli ..................... 264/310 |

* cited by examiner

Primary Examiner—Brian Healy
(74) Attorney, Agent, or Firm—James L. Clingan, Jr.

(57) ABSTRACT

An apparatus which aligns a fiber core to a detector on an integrated circuit has a transmission material connecting them which steers the light provided through the fiber core to the detector even in the case of misalignment. The transmission material chosen has a characteristic of being able to have the spatial distribution of its index of refraction altered by electrical means. In this case, an electric field is applied in the area surrounding the path from the fiber core to the detector. Thus, even if the fiber core is not aligned to the detector, the light will be directed from the fiber core to the detector due to the path being surrounded by a lower index of refraction than the path itself. Thus, there is very little loss due to misalignment between the fiber core and the detector.

17 Claims, 1 Drawing Sheet

METHOD AND APPARATUS FOR ALIGNING A WAVEGUIDE TO A DEVICE

FIELD OF THE INVENTION

The invention generally relates to optical devices, and more particularly, to coupling optical devices together.

BACKGROUND OF THE INVENTION

There are many uses for fiber optics including data transmission in addition to the use for image transmission. Particularly in the case of data transmission, where the volumes of the integrated circuits utilized will be high in volume, one of the problems is the amount of time required to align the fiber optic source to the detector which is present on the integrated circuit. The data transmission may have a lot of noise, and it may have been degraded over distance and multiple sources of interference. Thus, it is important to have as much signal, which in this case is light, applied to the detector. In order to optimize the amount of light received by the detector, precision adjustment equipment has been required. There is an alignment issue not just having it centered over the detector but also there is an angular dimension. The fiber optic's center point may be over the detector's center point, but at an angle, which would potentially cause some of the light to not be applied to the detector.

There is also the problem that after alignment has been optimized, the structure must be fixed in place. In the process of applying the adhesive material, which will affix the fiber optic material in the aligned position with the detector, the alignment may be partially lost. There may be movement of the integrated circuit which contains the detector in relation to the fiber optic material during the adhesion process. Thus, there is a need for an improved technique for aligning the fiber optic material, which operates as a waveguide, to the detector of the light transmitted through the waveguide.

DETAILED DESCRIPTION

Figure 1:
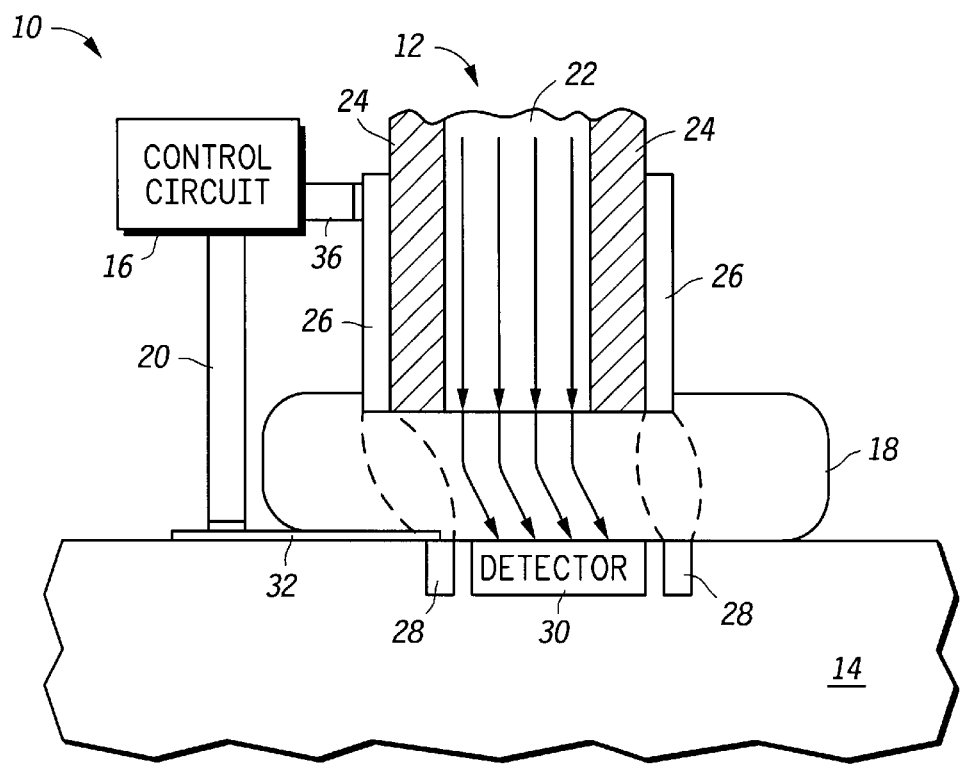
FIG. 1 is a layout and cross section of an apparatus for aligning a waveguide to a device according to a preferred embodiment of the invention.

Shown in FIG. 1 is an apparatus 10 for aligning a waveguide 12 to a device 14. Included in this apparatus is a control circuit 16 and a transmission material 18 and a probe 20. Waveguide 12 comprises a fiber core 22 which is surrounded by a fiber cladding 24 which in turn is surrounded by an electrode ring 26 which is a conductive ring. Waveguide 12 has a coupling end, facing device 14, for coupling to another optical device such as another waveguide, a light detector, or a light emitter. Device 14 comprises an electrode ring 28 which is also a conductive ring, a detector 30, and a metal contact line 32. Electrode ring 28 surrounds detector 30. Detector 30 is for detecting a light signal coming from the coupling end of waveguide 12. Metal contact line 32 is along a top surface of device 14 and is in physical and electrical contact with electrode ring 28. Attached to waveguide 12 is a metal contact line 34 which makes physical and electrical contact with electrode ring 26. Control circuit 16 makes physical and electrical contact with electrode rings 26 and 28, using probes 36 and 20 respectively. In this case detector 30 has a coupling end at the top surface of device 14. In an ideal case, fiber core 22 is perfectly aligned with detector 30. In practice, this may be difficult and time consuming to achieve, if in fact achieved.

Shown in FIG. 1 is a situation in which fiber core 22 is not perfectly aligned with detector 30. Transmission material 18 is a liquid crystalline polymer. An example of such liquid crystalline polymer is alkylcyanobiphenyl moiety on a polymer backbone. An example of such a polymer backbone is polyethylene. An important characteristic of transmission material 18 is that it is able to have the spatial distribution of its index of refraction altered by electrical means. The waveguide is brought into close proximity to device 14. Transmission material 18 is applied between the waveguide and device 14. The transmission material 18 is applied at a temperature above its glass transition temperature. Subsequently, control circuit 16 applies a voltage differential between electrode ring 26 and electrode ring 28. This voltage differential should be preferably in a range between 10 and 100 volts. For example, 50 volts could be applied to electrode ring 26 and 0 volts (ground) could be applied to electrode ring 28. As this voltage differential is applied between electrode ring 26 and electrode ring 28, transmission material 18 is cooled to a temperature below its glass transition temperature. After transmission material 18 has been cooled to a temperature below its glass transition temperature, control circuit 18 can be removed so that no voltage differential is any longer applied between electrode ring 26 and electrode ring 28.

The effect of applying the voltage difference between electrode ring 26 and electrode ring 28 during the period that transmission material 18 cools to a temperature below its glass transition temperature is to increase the index of refraction along the electric field in the areas of transmission material 18 which are aligned between electrode ring 26 and electrode ring 28 and decreasing the index of refraction perpendicular to the electric field. The resulting anisotropic index of refraction in the area surrounding a direct path between fiber core 22 and detector 30, will cause light waves carried by fiber core 22 to exit fiber core 22 and be bent to propagate nearly directly to detector 30. This path between fiber core 22 and detector 30 is thus the path the light will take even though that is not the straightest path to device 14. If transmission material 18 had a homogeneous index of refraction, light from fiber core 22 would extend directly down on the surface of device 14 with a significant portion of the light missing detector 30. The straightest path is in effect blocked or at least steered away from by the presence of a lower index of refraction selectively formed by the electric field caused by applying a voltage differential to electrode rings 26 and 28. The path the light will take is to detector 30 because the path to detector 30 has a higher index of refraction. This path between fiber core 22 and detector 30 is in effect a tunnel of a relatively higher index of refraction surrounded by material of an altered index of refraction forming a waveguide. The material of the altered index of refraction provides a lower index of refraction at the angle the light would strike it if it continued in a straight line through fiber core 22. This path of the light due to the path of the waveguide is shown in FIG. 1 by arrows extending from fiber core 22 to detector 30. The electric field generated between electrode ring 26 and electrode 28 is shown by dashed lines connecting electrode 26 and electrode 28 in FIG. 1.

The liquid crystalline polymer above its glass transition temperature will align itself in the direction of the electric field applied, and in this direction it increases its index of refraction and perpendicular thereto decreases its index of refraction. Here it is shown that the resulting structure of detector 30 misaligned with fibercore 22 still results in a very high percentage of the light energy passing through fibercore 22 passing to detector 30. Thus, this is an advantage over transmission material which does not have a waveguide aligned from fiber core 22 to detector 30.

Figure 2:
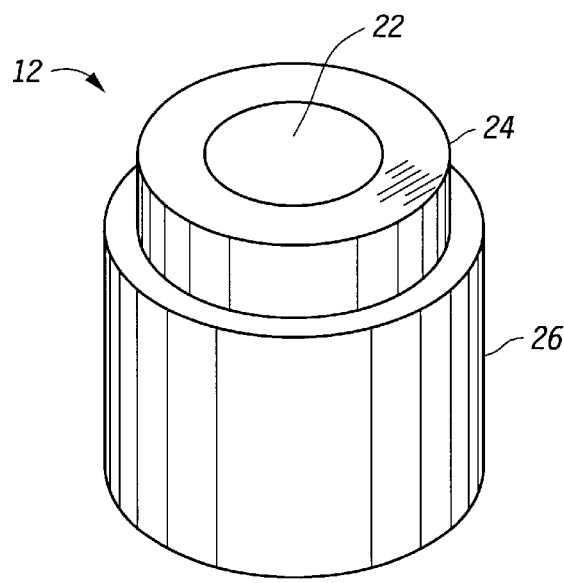
FIG. 2 is a perspective view of a portion of the apparatus of FIG. 1.

Shown in FIG. 2 is a perspective of waveguide 12 which comprises fibercore 22, fiber cladding 24 and electrode ring 26. This is shown for clarity and ease of understanding of the configuration of waveguide 12.

A similar approach can be used in which one of the optical devices is actually a source of light instead of a detector such as detector 30. An integrated circuit such as device 14 could generate a light signal which could be similarly steered to the center of the fiber core by having a low index of refraction area surrounding the path between the fiber core and the source. Similarly, this approach can be used to couple two waveguides together. Also, because the electrode rings may only be required at the initial shaping of the index of refraction, the electrode rings may be removable. This may not be practical when one of the optical devices is in an integrated circuit but may well be for a waveguide such as waveguide 12.

Another possibility would be to use materials which have their index of refraction changed by application of an electric field, but that application does not cause a permanent change in the index of refraction. In such a case, there would need to be a continuously applied voltage differential between the electrode ring which surrounds the fibercore and to the electrode ring which surrounds the detector or source of the light. Another material that could be used is a UV curable material which is has an index of refraction changed by an electric field while being activated by ultra violet light.

Also another material type is thermoset polymers which provide a greater resistance to change to its spatial distribution of the index of refraction after having such spatial distribution set. When the index of refraction surrounding the light path is set to be less than the index of refraction in the light path itself by the electrical means described herein, further heating the material results in a chemical reaction which cannot be changed except by much higher temperatures than originally used in setting the spatial distribution of the index of refraction. This then provides a high degree of resistance to change in the spatial distribution of the index of refraction.

What is claimed is:

1. An apparatus, comprising:
    a waveguide which transmits light waves having a coupling end and a first conductive ring around the coupling end;
    a device having a light detector on a top surface thereof and a second conductive ring around the light detector;
    a liquid crystalline polymer between the detector and the coupling end.

2. An apparatus, comprising:
    a first optical device having a first coupling end and a first conductive ring around the coupling end;
    a second optical device having a second coupling end and a second conductive ring around the second coupling end;
    a transmission material between the first and second coupling ends,
        wherein the transmission material has an index of refraction which varies with an electric field applied thereto.

3. The apparatus of claim 2, wherein the first optical device and the second optical devices are waveguides.

4. The apparatus of claim 2, wherein:
    light transmitted from the first optical device to the second optical device is in a first direction;
    light passing from the first optical device to the second optical device follows a first path through the transmission material; and
    the transmission material has a decrease in the index of refraction around the first path and in the first direction in response to a first voltage applied to the first conductive ring and a second voltage applied to the second conductive ring.

5. A method of coupling a first coupling end of a first optical device to a second coupling end of a second optical device, comprising the steps of:
    surrounding the first coupling end with a first voltage;
    surrounding the second coupling end with a second voltage which is different than the first voltage; and
    forming a transmission material between the first and second coupling ends, wherein the transmission material has an index of refraction which varies with an electric field applied thereto.

6. The method of claim 5, wherein:
    the first optical device is fiber optic and the second optical device is an optical detector.

7. The method of claim 5, wherein the first optical device and the second optical devices are waveguides.

8. The method of claim 5, wherein the first optical device is fiber optic and the second optical device is a light source.

9. The method of claim 5, wherein
    light transmitted from the first optical device to the second optical device is in a first direction;
    light passing from the first optical device to the second optical device follows a first path through the transmission material; and
    the transmission material has a decrease in the index of refraction around the first path and in the first direction in response to the first voltage and the second voltage.

10. The method of claim 9, further comprising removing the first and second voltage.

11. The method of claim 10, wherein the increase in the index of refraction remains after the removing of the first and second voltage.

12. The method of claim 11, further comprising:
    heating the transmission material to a temperature greater than a glass transition temperature thereof before removing the first and second voltage; and
    after heating the transmission material, cooling the transmission material to a temperature below the glass transition temperature before removing the first and second voltage.

13. The method of claim 11, further comprising:
    applying ultra violet light to the transmission material before removing the first and second voltage; and
    after applying the ultra-violet light, stopping the application of the ultra-violet light, before removing the first and second voltage, to initiate a chemical reaction in the transmission material.

14. An optical apparatus comprising:
    a first optical device having a first coupling end;
    a second optical device having a second coupling end; and
    a transmission material between the first and second coupling ends;

wherein:
light transmitted from the first optical device to the second optical device is in a first direction and follows a first path through the transmission material; and the transmission material, in the first direction, has a first index of refraction in the first path and a second index of refraction surrounding the first path, the second index of refraction being greater than the first index of refraction.

15. The optical apparatus of claim 14, wherein the first optical device is fiber optic and the second optical device is an optical detector.

16. The optical apparatus of claim 14, further comprising:
a conductive ring around the first coupling end.

17. The optical apparatus of claim 16, further comprising:
a conductive ring around the second coupling end.

* * * * *